United States Patent
Arthur et al.

(10) Patent No.: US 10,882,153 B2
(45) Date of Patent: Jan. 5, 2021

(54) CLAMSHELL VACUUM DUST EXTRACTION APPARATUS FOR A PERCUSSIVE AIR TOOL

(71) Applicants: Robert Arthur, Trenton, MI (US); Nathaniel P Wenzel, Lyndhurst, OH (US); Nicholas J Russell, Kirtland, OH (US)

(72) Inventors: Robert Arthur, Trenton, MI (US); Nathaniel P Wenzel, Lyndhurst, OH (US); Nicholas J Russell, Kirtland, OH (US)

(73) Assignee: G.A.W. Inc, Romulus, MI (US)

( * ) Notice: Subject to any disclaimer, the term of this patent is extended or adjusted under 35 U.S.C. 154(b) by 221 days.

(21) Appl. No.: 16/104,989

(22) Filed: Aug. 20, 2018

(65) Prior Publication Data
US 2020/0055154 A1 Feb. 20, 2020

(51) Int. Cl.
*B23Q 11/00* (2006.01)
*B25D 17/20* (2006.01)

(52) U.S. Cl.
CPC ...... *B23Q 11/0046* (2013.01); *B23Q 11/0071* (2013.01); *B25D 17/20* (2013.01); *B25D 2217/0057* (2013.01); *B25D 2222/72* (2013.01)

(58) Field of Classification Search
CPC ............... B23Q 11/0046; B23Q 11/0071; B25D 17/22; B25D 17/2217; B25D 2217/0065; B25D 2222/72
USPC ............................................ 173/198
See application file for complete search history.

(56) References Cited

U.S. PATENT DOCUMENTS

| | | | |
|---|---|---|---|
| 2,246,916 A * | 6/1941 | Baker | |
| 3,638,737 A * | 2/1972 | Fischer | |
| 6,193,448 B1 * | 2/2001 | Brennan | |
| 9,022,702 B2 * | 5/2015 | Kasuya | B25D 17/088 408/67 |
| 2007/0264091 A1 * | 11/2007 | Bleicher | B23Q 11/0046 408/58 |
| 2008/0145160 A1 * | 6/2008 | Fritsche | B23B 49/023 408/95 |
| 2010/0170538 A1 * | 7/2010 | Baker | B25F 5/02 134/18 |

(Continued)

OTHER PUBLICATIONS

U.S. Appl. No. 16/025,457, filed Mar. 14, 2019, Arthur, Robert.

*Primary Examiner* — Chelsea E Stinson
*Assistant Examiner* — Himchan Song
(74) *Attorney, Agent, or Firm* — Mark A Navarre

(57) ABSTRACT

A vacuum dust extraction apparatus for a percussive air tool contains and extracts workplace dust created by the impacting action of the air tool's implement. The apparatus includes a clamshell adapter constructed as two halves that are oppositely disposed about the air tool's retainer, and joined to enclose the retainer, and a tubular dust bellows fastened to the outboard end of the joined clamshell halves. The clamshell adaptor includes an integral exhaust port, and an industrial vacuum coupled to the exhaust port via a flexible suction/vacuum hose creates suction in the bellows for extracting airborne dust created by percussive action of the implement on a workpiece. Suction loss through the clamshell adaptor is minimized by a sealing element that bridges a gap between the interior periphery of the clamshell adaptor and the exterior periphery of the air tool's retainer.

9 Claims, 4 Drawing Sheets

(56) References Cited

U.S. PATENT DOCUMENTS

| | | | |
|---|---|---|---|
| 2010/0186852 A1* | 7/2010 | Shepherd | B23Q 11/0046 144/252.1 |
| 2011/0008118 A1* | 1/2011 | Yoshikane | B23Q 11/0046 408/67 |
| 2014/0093320 A1* | 4/2014 | Sullivan | B25F 3/00 408/67 |

* cited by examiner

CLAMSHELL VACUUM DUST EXTRACTION APPARATUS FOR A PERCUSSIVE AIR TOOL

TECHNICAL FIELD

This invention relates to a vacuum dust extraction system for a percussive air tool such as a chisel hammer or rivet buster, and more particularly to an apparatus secured to the air tool for containing and extracting airborne dust created by the percussive action of the air tool.

BACKGROUND OF THE INVENTION

Pneumatically operated percussive air tools such as pick or chisel hammers, rivet busters, and so forth are frequently used in industrial applications, and various expedients have been employed to minimize or contain airborne dust produced by the percussive action of the air tool's implement. As disclosed, for example, in the U.S. Pat. No. 7,740,086 to Bleicher et al. and U.S. Pat. No. 9,022,702 to Kasuya et al., this can be achieved with a dust containment hood attached to the implement end of the air tool's housing and an industrial vacuum that draws dust out of the dust containment hood and captures it for later disposal.

While this approach is effective, air tools can vary considerably depending on their rating and type, so that a dust containment hood designed to work with one type of air tool will not necessarily work with other air tools. Also, the dust containment hood must be securely attached to the air tool so that it stays in place during use and transportation of the air tool. Accordingly, what is needed is an improved dust extraction apparatus that is applicable to a variety of air tools, and that is robust, and easily and securely installed on an air tool.

SUMMARY OF THE INVENTION

The present invention is directed to an improved vacuum dust extraction apparatus for a percussive air tool for containing and extracting workplace dust created by the impacting action of the air tool's implement. The improved apparatus includes a clamshell adapter constructed as two halves that are oppositely disposed about an air tool's implement retainer, and joined to enclose the retainer, and a tubular dust bellows fastened to the outboard end of the joined clamshell halves. The clamshell adaptor includes an integral exhaust port, and an industrial vacuum coupled to the exhaust port via a flexible suction/vacuum hose creates suction in the bellows for extracting airborne dust created by percussive action of the implement on a workpiece. Suction loss through the clamshell adaptor is minimized by a sealing element that bridges a gap between the interior periphery of the clamshell adaptor and the exterior periphery of the air tool's retainer.

DESCRIPTION OF THE PREFERRED EMBODIMENT

Figure 1:
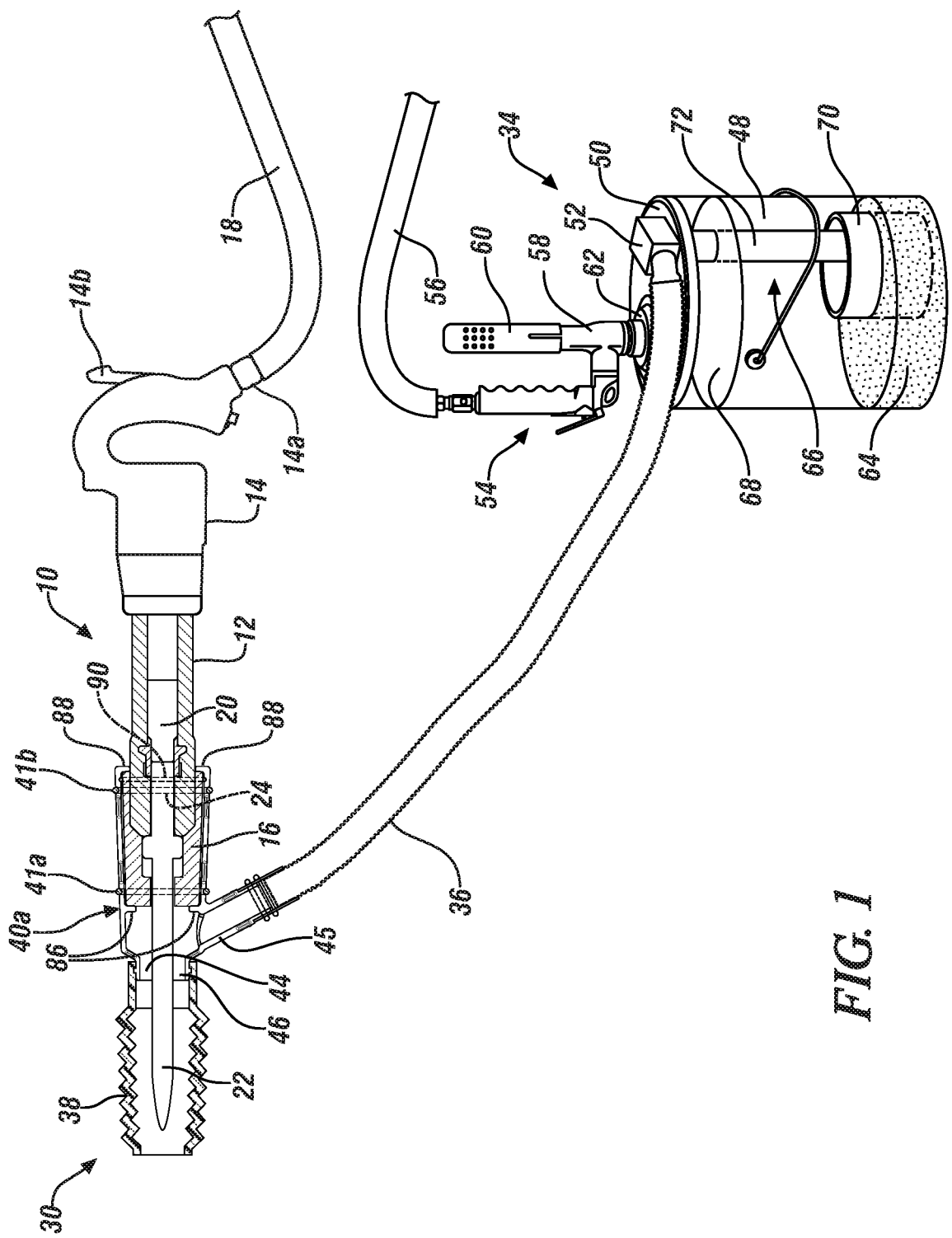
FIG. 1 is a diagram of a vacuum dust extraction system, including the clamshell dust extraction apparatus of this invention, as applied to a percussive chisel hammer air tool.

In general, the clamshell vacuum dust extraction apparatus of this invention is applicable to a variety of percussive air tools, such as chipping hammers, riveting hammers, rivet busters, demolition tool drivers, pavement breakers, rock drills, and so on. By way of example, the vacuum dust extraction apparatus of this invention is illustrated as applied to an otherwise conventional percussive chisel hammer air tool. In FIG. 1, the chisel hammer, generally referred to herein simply as an air tool, is generally designated by the reference numeral 10.

Referring to FIG. 1, the air tool 10 includes a tubular barrel 12 fitted with a handle 14 at one axial end and a retainer 16 at the other axial end. The handle 14, which may take various other shapes (D-shaped, or T-shaped, for example), includes an inlet port 14a adapted to be coupled to a source of compressed air by the air hose 18, an internal air passage coupling the inlet port 14a to a piston 20 by way of a control valve (not shown) operated by a trigger 14b integrated into the handle 14. The implement or tool 22, a chisel in the illustration of FIG. 1, is received within the barrel 12, and the retainer 16 is locked onto the barrel 12 with a retainer spring 24 (removably inserted through a slot opening 16a in the sidewall of retainer 16; see FIGS. 2-3) to retain the chisel 22 within the barrel 12.

The vacuum dust extraction apparatus includes a dust extraction unit generally designated by the reference numeral 30, an industrial vacuum 34, and a flexible suction hose 36 coupling the dust extraction unit 30 to the vacuum 34. In general, the dust extraction unit 30 includes a flexible dust bellows or boot 38 with accordion-style pleating, and a clamshell adaptor 40 coupling the bellows 38 to the air tool 10. The body of bellows 38 surrounds the chisel 22, extending substantially to the chisel's tip as shown in FIG. 1. Preferably, the bellows 38 is relatively transparent so as to not obstruct the user's view of the chisel 22 and the workpiece in the area of the chisel's tip; this also allows the user to visibly confirm that the bellows 38 is not getting clogged with dust. The inboard end of dust bellows 38 slides over a tubular sleeve 44 on the outboard end of clamshell adaptor 40. The suction hose 36 is coupled to an integral outlet port 45 of clamshell adaptor 40, and dust generated by the action of the chisel 22 is drawn out of the dust bellows 14 and into the suction hose 36 by way of an annular cavity 46 between the chisel 22 and the interior periphery of the clamshell adaptor 40.

The illustrated industrial vacuum 34 generally comprises a standard 5-gallon metal pail or canister 48 and a metal lid 50 releasably secured to the upper rim of canister 48. The downstream end of suction hose 36 is fastened to the inlet of a vacuum port 52 mounted on the lid 50, and a vacuum unit 54 also mounted on the lid 50 creates a suction in the canister 48 that draws dust-laden air from the dust extraction unit 30 into the canister 480, and then exhausts clean air to atmosphere. Although not shown in FIG. 1, the sidewall of the canister 48 preferably includes a number of circumferential ribs to impart additional stiffness and resistance to flexure.

The vacuum unit 54 is preferably a pneumatic vacuum operated by compressed air supplied from an air hose 56; the vacuum unit 54 includes a venturi 58, and the compressed air is directed into venturi 58 through a distributed array of internal air passages (not shown) to create suction upstream of venturi 58. In this case, the downstream or outlet end of the venturi 58 is vented to atmosphere through an exhaust diverter 60, and the upstream or inlet end of venturi 58 is coupled to a venturi mount 62 fastened to the lid 50 of canister 48.

As indicated in FIG. 1, a volume of water 64 (referred to herein as the confined water) is placed in the bottom of the canister 48, to a depth of approximately 3 inches, and the dust-laden air entering canister 48 via vacuum port 52 is cleansed of dust by a water filtration unit 66 housed within the canister 48 and partially submerged in the confined water 64. The vacuum 34 also includes a baffle disk 68 disposed in the upper portion of the canister 48, so that the cleansed air exiting water filtration unit 66 passes through the baffle disk 68 prior to being exhausted to atmosphere though the venturi 58 of vacuum unit 54. The purpose of the baffle disk 68 is primarily to prevent any of the confined water 64 from entering the venturi 58.

The water filtration unit 66 includes a cylindrical velocity ring 70 supported on the bottom or floor of canister 48, and a pipe 72 extending downward from the vacuum port 52 and into the velocity ring 70. The confined water 64 is free to flow under the velocity ring 70, filling it to substantially the same depth as the rest of the confined water 64, and the pipe 72 extends down into the confined water 58 within velocity ring 70. The bottom of the pipe 72 is closed, and a small circular opening (not shown) in the sidewall of pipe 72 just above its closed end defines an exit port through which the dust-laden air entering vacuum port 52 must pass. In general, the dust-laden air exits the circular opening in pipe 72 well below the surface of the confined water 64 in a high velocity stream that creates a high degree of turbulence in the confined water within velocity ring 70. This creates a frothy mixture that bubbles up and out of the velocity ring 70, and into the interior volume of the canister 48. The turbulent mixing of dust-laden air and confined water 64 within the velocity ring 70 tends to very thoroughly saturate or wet the airborne dust so that the air released into the canister 48 in the space between the confined water 64 and baffle disk 68, and thereafter exhausted through the venturi 58, is virtually free of dust.

Figure 2:
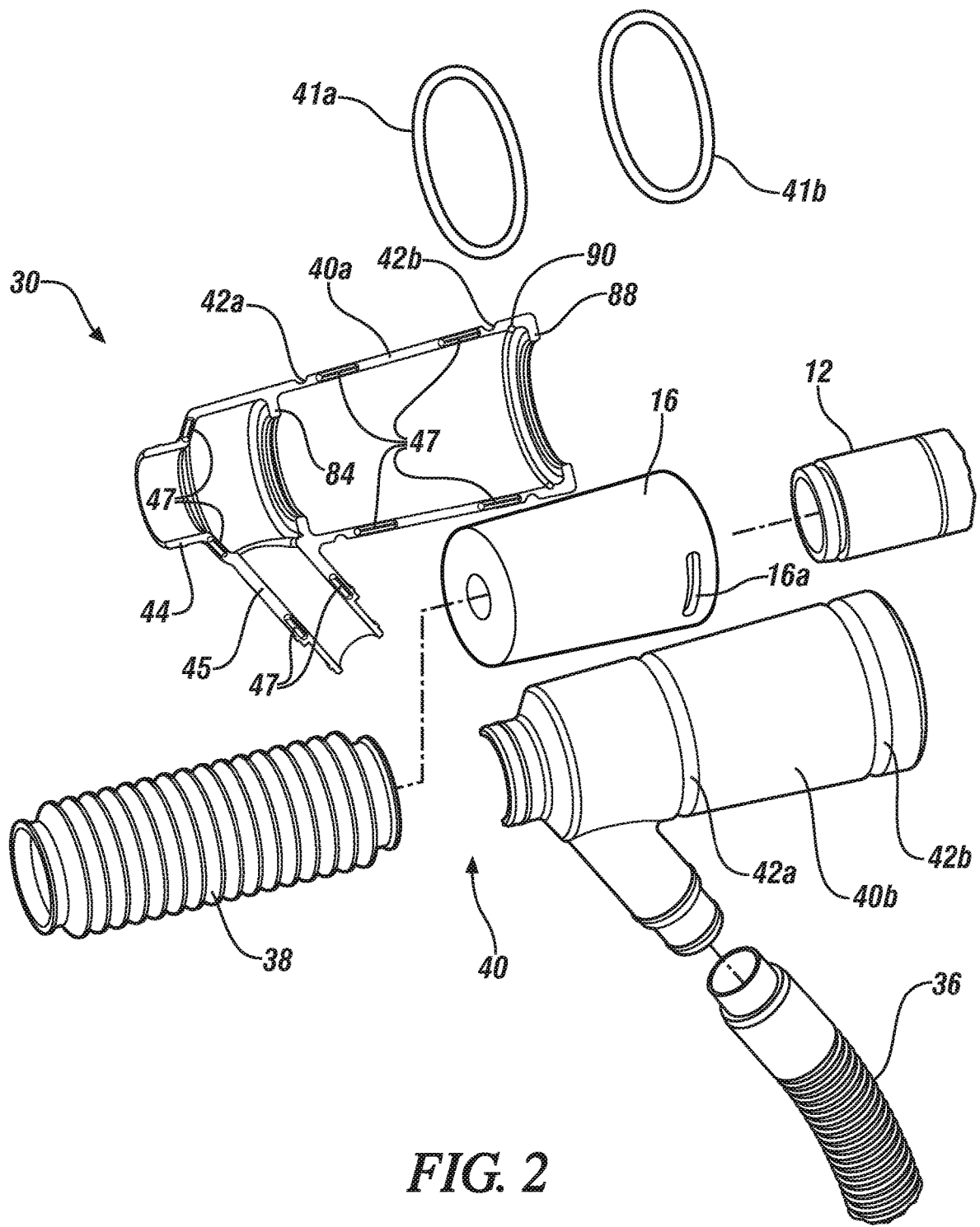
FIG. 2 is an exploded isometric diagram of the dust extraction portion of the vacuum dust extraction system of FIG. 1.
Figure 3:
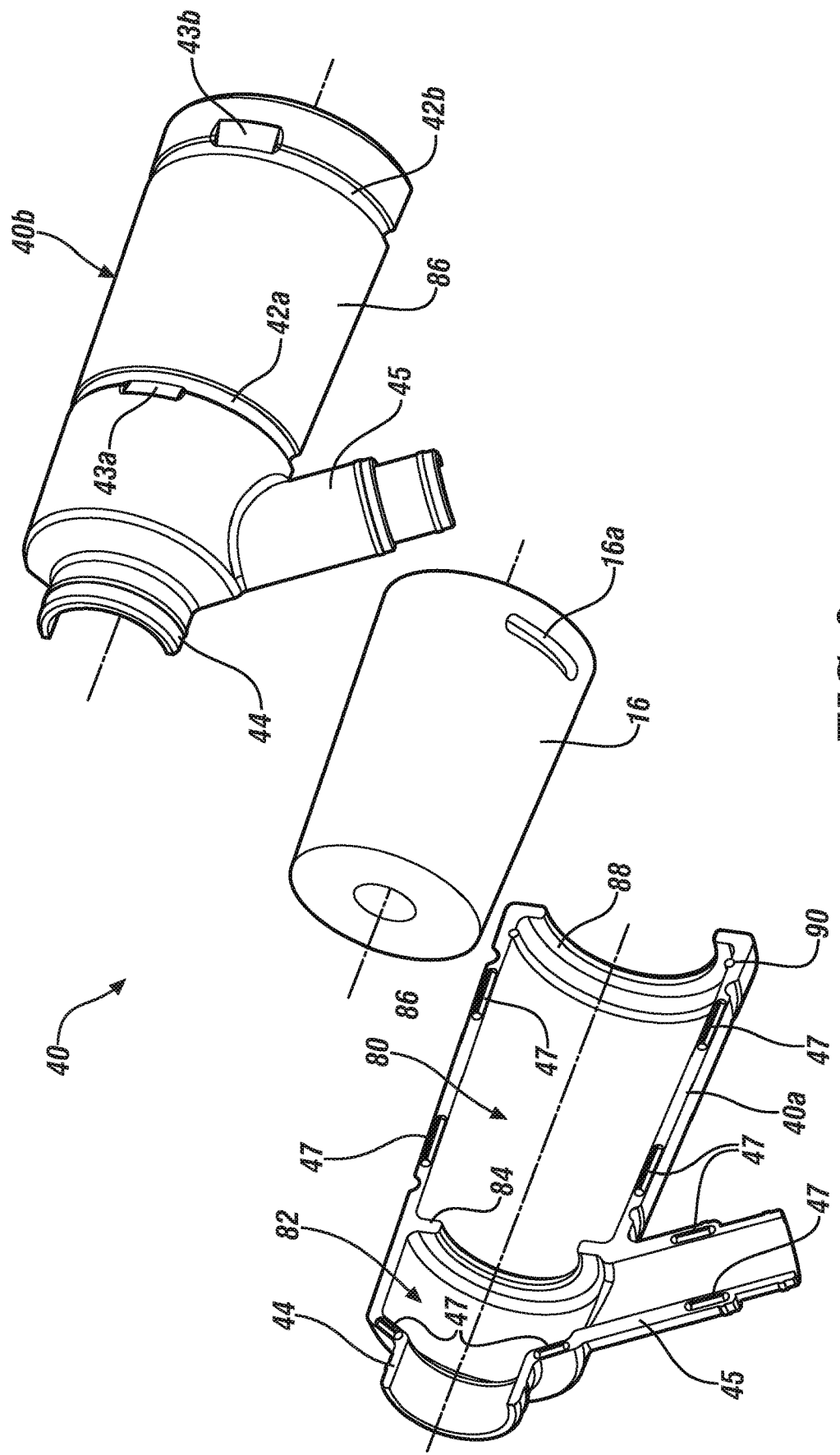
FIG. 3 is an exploded diagram of the clamshell adaptor of FIG. 1 with an air tool retainer.
Figure 4:
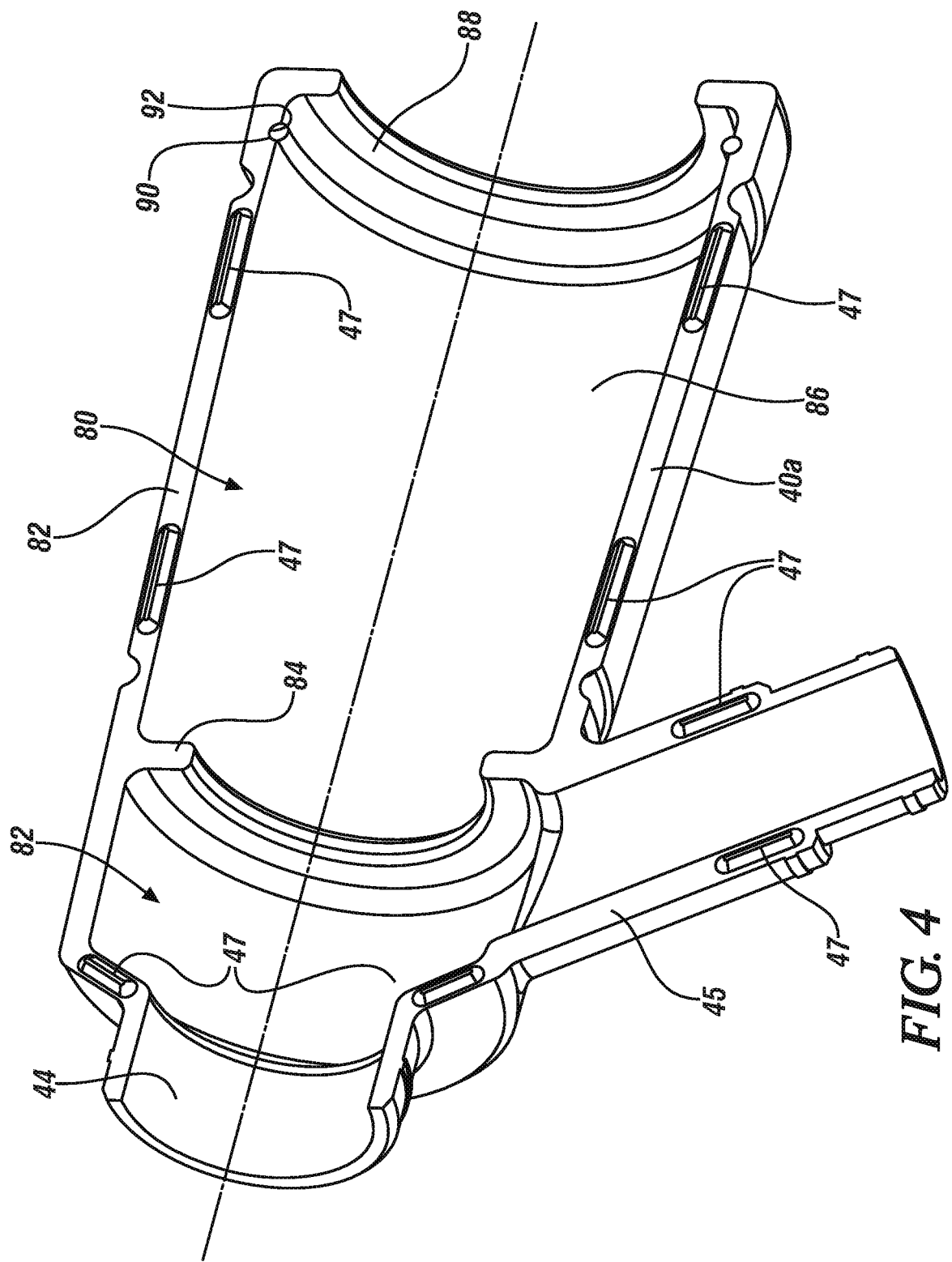
FIG. 4 is an isometric view of a clamshell adaptor half.

FIGS. 2-4 depict the clamshell adaptor 40 and its usage in more detail. As best seen in the exploded view of FIG. 2, the clamshell adaptor 40 includes first and second complementary halves 40a, 40b that are joined to create a unitary part that encapsulates the air tool retainer 16 and provides connection points for both the suction hose 36 and the bellows 38. As seen in FIGS. 2-4, the mating faces of the clamshell halves 40a, 40b are provided with complementary alignment features—such as the pills 47 on clamshell half 40a and the corresponding recesses (not shown) on the clamshell half 40b—to aid in mating alignment and to resist relative movement of the mated halves 40a, 40b. With the clamshell halves 40a, 40b so joined, they are fastened together with a pair of elastic O-rings 41a, 41b seated in circumferential grooves 42a, 42b formed on the exterior peripheries of the clamshell halves 40a, 40b. As shown in FIG. 3, at least one of the clamshell halves 40a, 40b can be provided with sidewall openings 43a, 43b that overlap the circumferential grooves 42a, 42b to facilitate subsequent user removal of O-rings 41a, 41b when it is desired to separate the dust extraction unit 30 from the air tool 10.

With the two clamshell halves 40a, 40b joined, their mating features form a first interior compartment 80 that closes around the retainer 16, and a second interior compartment 82 that couples the bellows 38 to the suction hose 36. The inboard and outboard compartments 80, 82 are separated by a shoulder 84 that depends radially inward from the inner periphery of the adaptor sidewall 86. The inboard compartment 80 extends to the inboard end of the adaptor 40, and terminates in a radially inward depending flange 88. With the two clamshell halves 40a, 40b joined around the retainer 16, the shoulder 84 and flange 88 close around the front and rear axial faces of the retainer 16 to securely fasten the clamshell adaptor 40 to the retainer 16, and hence, the air tool 10. The interior compartment 82 is axially outboard of the interior compartment 80, and serves as a plenum through which dust laden air in the bellows 38 is drawn into the suction hose 36. Thus, the interior compartment 82 is open to both the tubular sleeve 44 at the axially outboard end of clamshell adaptor 40, and the outlet or suction port 45 in the sidewall 86 of clamshell adaptor 40.

Although the shoulder 84 and flange 88 secure the clamshell adaptor 40 to the retainer 16, they do not form a seal as such, and the suction of industrial vacuum 54 could draw atmospheric air into the space between the retainer 16 and the clamshell adaptor 40. To minimize any such suction loss, the clamshell adaptor 40 additionally includes a sealing element 90 just outboard of the flange 88. As best seen in FIG. 4, the sealing element 90, which may be cylindrical fiber material, is partially received in a semi-circular groove 92 formed on inner periphery of the clamshell adaptor's sidewall 86. The sealing element 90 is secured in the groove 92 with a suitable adhesive, and protrudes out of the groove 92 to seal the small gap between the clamshell adaptor's sidewall 86 and the retainer 16. And as seen in FIG. 1, the sealing element 90 is disposed inboard of the retainer spring 24 that secures the retainer 16 to the air tool's barrel 12.

In summary, the clamshell vacuum dust extraction apparatus of the present invention operates to efficiently and effectively contain and extract workplace dust produced by percussive impacting of an air tool's implement on a workpiece. The various elements of the apparatus may be sized differently than shown, and may be constructed of metal or plastic, as appropriate. And of course, it will be recognized that while the invention has been described in reference to the illustrated embodiments, numerous modifications and variations in addition to those mentioned herein will occur to those skilled in the art. Accordingly, it will be appreciated that systems incorporating these and other modifications and variations still fall within the intended scope of the invention.

The invention claimed is:

1. Vacuum dust extraction apparatus for an air tool that percussively drives an implement, said apparatus comprising:
   a retainer locked onto a barrel of said air tool with a retainer spring to retain an inboard end of said implement;
   a tubular bellows surrounding an exposed portion of the implement for containing workplace dust produced when the implement percussively impacts a workpiece; and
   a clamshell adaptor including first and second halves oppositely disposed about said retainer and joined to close around said retainer in a manner to secure said clamshell adaptor to said retainer, a tubular sleeve received within one end of said tubular bellows, an integral exhaust port coupled to a suction hose so that the workplace dust in said tubular bellows is drawn through said clamshell adaptor and into said suction hose, grooves formed on inner peripheries of said first and second clamshell adaptor halves, and first and second sealing elements seated in said grooves so that with said clamshell adaptor halves so joined, said first and second sealing elements fill a gap between an inner periphery of said clamshell adaptor and an exterior periphery of said retainer to minimize suction loss through said clamshell adaptor.

2. The vacuum dust extraction apparatus of claim 1, further comprising:
   circumferential grooves formed on exterior peripheries of said first and second clamshell adaptor halves; and
   elastic bands removably seated in said circumferential grooves to securely bind said joined first and second clamshell adaptor halves.

3. The vacuum dust extraction apparatus of claim 2, wherein:
   at least one of said first and second clamshell adaptor halves includes openings that partially overlap said circumferential grooves to facilitate user removal of said elastic bands.

4. The vacuum dust extraction apparatus of claim 1, further comprising:
   a plurality of mating alignment features formed on adjoining surfaces of said first and second clamshell adaptor halves to aid in alignment and to resist relative movement of the joined clamshell adaptor halves.

5. The vacuum dust extraction apparatus of claim 1, wherein:
   the joined first and second clamshell adaptor halves define a first interior compartment that encloses said retainer, and a second interior compartment open to both said tubular sleeve and said exhaust port so that the workplace dust in said tubular bellows is drawn through said second interior compartment and into said suction hose.

6. The vacuum dust extraction apparatus of claim 5, wherein:
   a semi-circular shoulder formed on an inner periphery of each of said first and second clamshell adaptor halves separates said first and second interior compartments.

7. The vacuum dust extraction apparatus of claim 5, wherein:
   said first and second sealing elements are adhered to an inner periphery of said first interior compartment to fill said gap between said interior periphery and said exterior periphery of said retainer to minimize suction loss through said clamshell adaptor.

8. Vacuum dust extraction apparatus for an air tool that percussively drives an implement, said apparatus comprising:
   a retainer locked onto a barrel of said air tool with a retainer spring to retain an inboard end of said implement;
   a tubular bellows surrounding an exposed portion of the implement for containing workplace dust produced when the implement percussively impacts a workpiece; and
   a clamshell adaptor including first and second halves oppositely disposed about said retainer and joined to close around said retainer in a manner to secure said clamshell adaptor to said retainer, a tubular sleeve received within one end of said tubular bellows, an integral exhaust port coupled to a suction hose so that the workplace dust in said tubular bellows is drawn through said clamshell adaptor and into said suction hose, a sealing element that fills a gap between an inner periphery of said clamshell adaptor and an exterior periphery of said retainer to minimize suction loss through said clamshell adaptor, and semi-circular flanges formed on inboard ends of said first and second clamshell adaptor halves that abut an inboard end of said retainer when said first and second clamshell adaptor halves are joined to close around said retainer.

9. The vacuum dust extraction apparatus of claim 8, further comprising:
   semi-circular shoulders formed on inner peripheries of said first and second clamshell adaptor halves that abut an outboard end of said retainer when said first and second clamshell adaptor halves are joined to close around said retainer.

* * * * *